No. 788,218. PATENTED APR. 25, 1905.
J. W. McAULIFFE.
SANITARY TRAP.
APPLICATION FILED AUG. 26, 1903.

WITNESSES:
Ada E. Hagerty
H. A. McClean

INVENTOR:
John W. McAuliffe
by Joseph A. Miller & Co.
ATTORNEYS.

No. 788,218. Patented April 25, 1905.

UNITED STATES PATENT OFFICE.

JOHN W. McAULIFFE, OF PROVIDENCE, RHODE ISLAND, ASSIGNOR TO THE McAULIFFE MANUFACTURING CO., OF PROVIDENCE, RHODE ISLAND, A CORPORATION OF RHODE ISLAND.

SANITARY TRAP.

SPECIFICATION forming part of Letters Patent No. 788,218, dated April 25, 1905.

Application filed August 26, 1903. Serial No. 170,824.

*To all whom it may concern:*

Be it known that I, JOHN W. McAULIFFE, a citizen of the United States, residing at Providence, in the county of Providence and State of Rhode Island, have invented a new and useful Improvement in Sanitary Traps, of which the following is a specification.

This invention has reference to an improvement in sanitary traps used to maintain a water seal between a basin or other plumbing-fixtures and the waste-pipe to which it is connected.

In sanitary traps used in plumbing it is essential that a large amount of water should be retarded and held at the end of the flow to form a perfect water seal in the trap.

The object of my invention is to improve the construction of a sanitary trap and by the improved construction give a more perfect flushing action without siphoning and hold a larger amount of water in the trap at the end of the flow to form a water seal than has heretofore been done.

My invention consists in the peculiar and novel construction of a sanitary trap having a two-part cylindrical body secured together by a screw-threaded ring, said ring having a flange forming an annular oblique shelf on the interior of the trap, an inlet-duct in the lower part of the body, an outlet-duct in the trap extending from near the top in the enlarged upper part of the body downward through the bottom of the trap, and a clean-out hole closed by a cover in the bottom, with other details of construction, as will be more fully set forth hereinafter.

Figure 1:
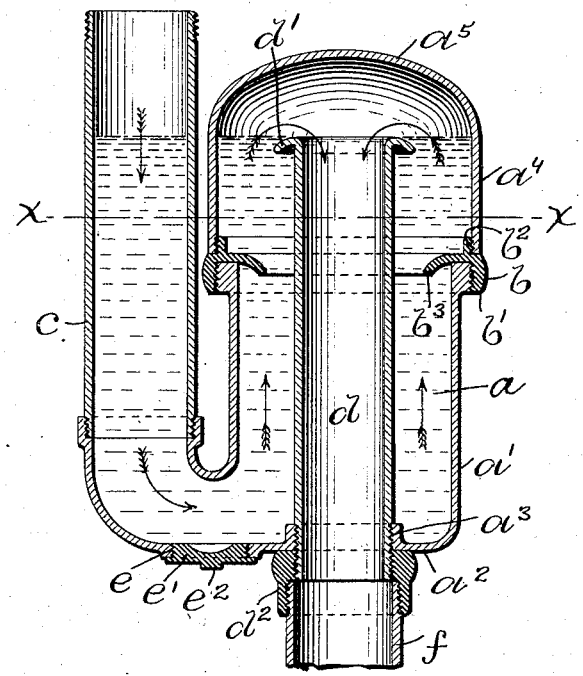
Figure 2:
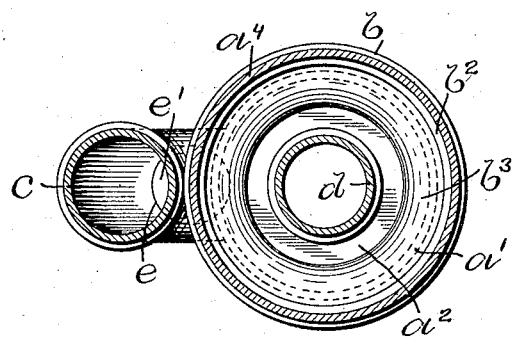

Figure 1 is a vertical sectional view of my improved sanitary trap, taken on a line through the inlet and outlet ducts; and Fig. 2 is a transverse sectional view of the trap, taken on line X X of Fig. 1.

In the drawings, $a$ indicates the cylindrical body of the trap formed in two parts; $b$, the connecting-ring; $c$, the inlet-duct; $d$, the outlet-duct; $e$, the clean-out hole, and $f$ the waste-pipe. The body $a$ of the trap consists of the lower cylindrical part $a'$, having the bottom $a^2$, with the screw-threaded flanged opening $a^3$ for the outlet-duct $d$ and the enlarged upper cylindrical part $a^4$, having the closed dome-shaped top $a^5$, secured together by the connecting-ring $b$, as shown in Fig. 1. The connecting-ring $b$ has the internal screw-threaded portion $b'$ in screw-thread engagement with the lower part $a'$, the external screw-threaded portion $b^2$ in screw-thread engagement with the upper part $a^4$ of the body $a$, and the inwardly-extending annular flange $b^3$. The inlet-duct extends downward and enters the lower part $a'$ of the body $a$ on a line with the bottom $a^2$. The outlet-duct $d$ has the outwardly-flaring annular lip $d'$ at its upper end. It is located centrally in the body of the trap and extends from a point near the top downward through the bottom $a^2$, where it is secured by screwing it into the opening $a^3$. The connection $d^2$ is screwed onto the lower end of the outlet-duct $d$, and the waste-pipe $f$ is screwed into the connection $d^2$. The clean-out hole $e$ is located in the bottom $a^2$ of the trap and has the cover $e'$, with the nut-head $e^2$, secured by screwing it into the clean-out hole.

The connecting-ring $b$ is located approximately one-third the way down from the top of the trap below the water-line and connects the two parts of the trap together by screwing the ring into the upper part of the body and then screwing the lower part of the body into the ring, forming a water-tight joint between the parts forming the body of the trap. The annular flange $b^3$ on the connecting-ring $b$ extends obliquely downward from the peripheral interior wall of the body $a$ and forms a contracted opening between the smaller lower part $a'$ and the larger upper part $a^4$ of the body $a$. The flange $b^3$, in conjunction with the lip $d'$ on the outlet-duct and the enlarged upper part of the body $a$, retards and holds back a predetermined amount of water to prevent siphoning of the trap and to form a seal in the trap at the end of the flow of water through the trap.

In practice I find that the inrush of water through the inlet-duct scours the bottom and lower interior wall of the trap, removing the sediment deposited in the trap. The water now flows upward through the contracted opening formed by the flange $b^3$ over the lip $d'$ and out through the outlet-duct $d$. The lip $d'$ on the inner end of the outlet-duct $d$ quickly breaks the siphon and, in conjunction with the flange $b^3$ and the enlarged upper part $a^4$ of the body $a$, holds back a sufficient amount of water in the trap to form a seal level with the inner end of the outlet-duct, as shown in Fig. 1.

The waste-pipe $f$, having a larger area than the outlet-duct $d$, allows the water to quickly free itself from the outlet-duct into the waste-pipe.

By my improved construction a more perfect flushing action is attained without siphoning, and a larger amount of water is retained in the trap to form a seal than has heretofore been done.

Having thus described my invention, I claim as new and desire to secure by Letters Patent—

1. A sanitary trap, consisting of a two-part body having inlet and outlet ducts and a connecting-ring provided with an inwardly-extending annular flange and adapted to secure the upper part of the body having a larger area to the lower part of the body having a smaller area below the water-line, as described.

2. A sanitary trap, consisting of a two-part body, the upper part having a greater area than the lower part, a ring having an inwardly-extending annular flange adapted to secure the two parts of the body together below the water-line, an inlet-duct connecting with the lower part of the body, an outlet-duct in the body extending centrally from a point above the connecting-ring downward through the bottom of the trap and having a smaller area than the waste-pipe to which it is connected, and a cover closing a clean-out hole in the bottom of the trap, as described.

3. In a sanitary trap, the combination of the two-part cylindrical body $a$ consisting of the lower part $a'$ having the bottom $a^2$ with the screw-threaded opening $a^3$, and the enlarged upper part $a^4$ having the dome-shaped top $a^5$, the connecting-ring $b$ having the internal screw-threaded portion $b'$, the external screw-threaded portion $b^2$, and the inwardly-extending annular flange $b^3$, the inlet-duct $c$, the outlet-duct $d$ having the lip $d'$ on its inner end and secured by screwing the lower end into the opening $a^3$, the cover $e'$ with the nut-head $e^2$ for the clean-out hole $e$, and means for securing the waste-pipe $f$ to the outlet-duct $d$ consisting of the screw-threaded connection $d^2$, all for the purpose as described.

In testimony whereof I have signed my name to this specification in the presence of two subscribing witnesses.

JOHN W. McAULIFFE.

Witnesses:
J. A. MILLER, Jr.,
ADA E. HAGERTY.